Oct. 18, 1927. W. A. UTTZ, SR Re. 16,774
GUMMED TAPE SERVING MACHINE
Original Filed Dec. 28, 1925 2 Sheets-Sheet 1
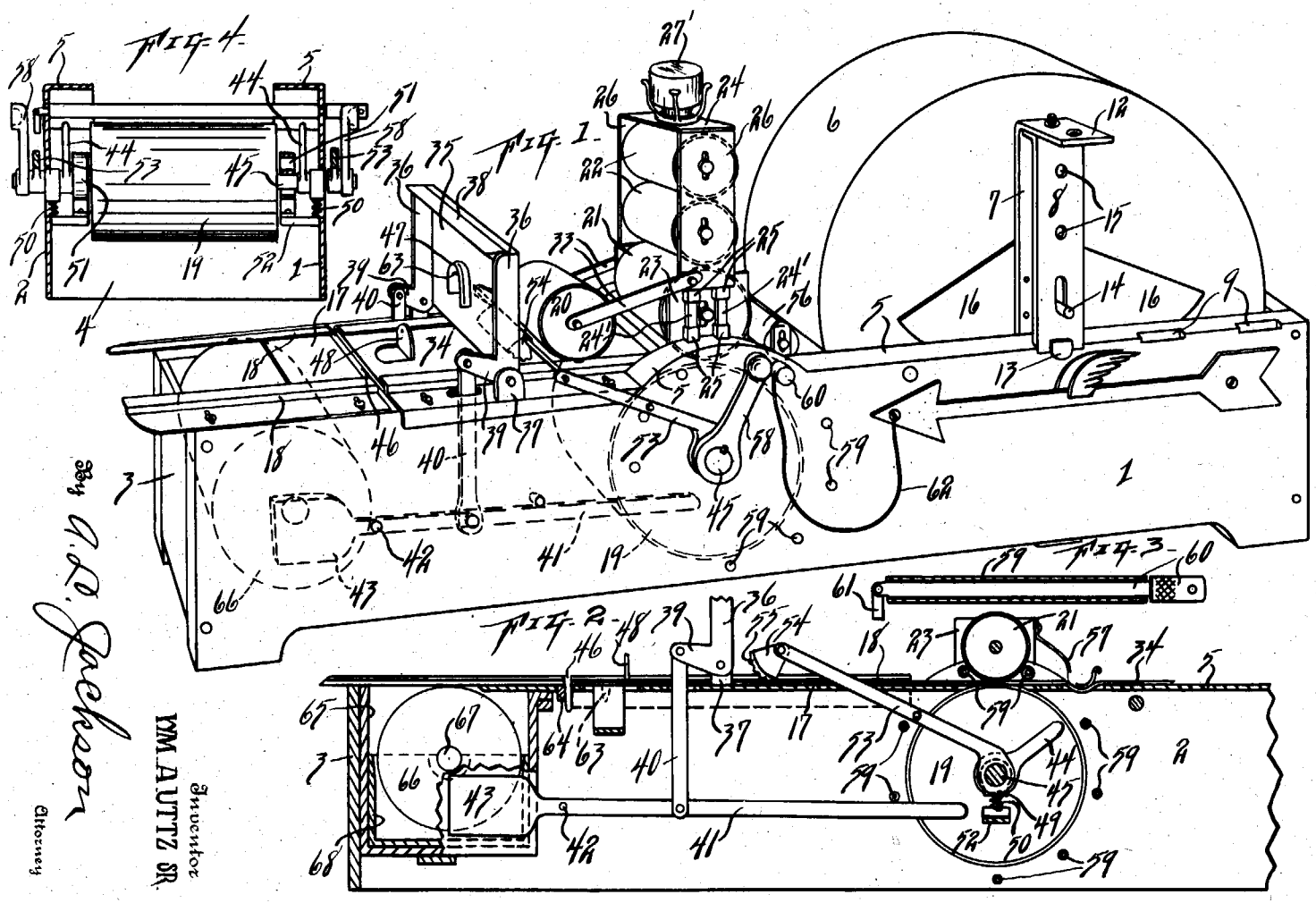
Inventor
WM. A. UTTZ SR.
By A. D. Jackson
Attorney Oct. 18, 1927. W. A. UTTZ, SR Re. 16,774
GUMMED TAPE SERVING MACHINE
Original Filed Dec. 28, 1925 2 Sheets-Sheet 2
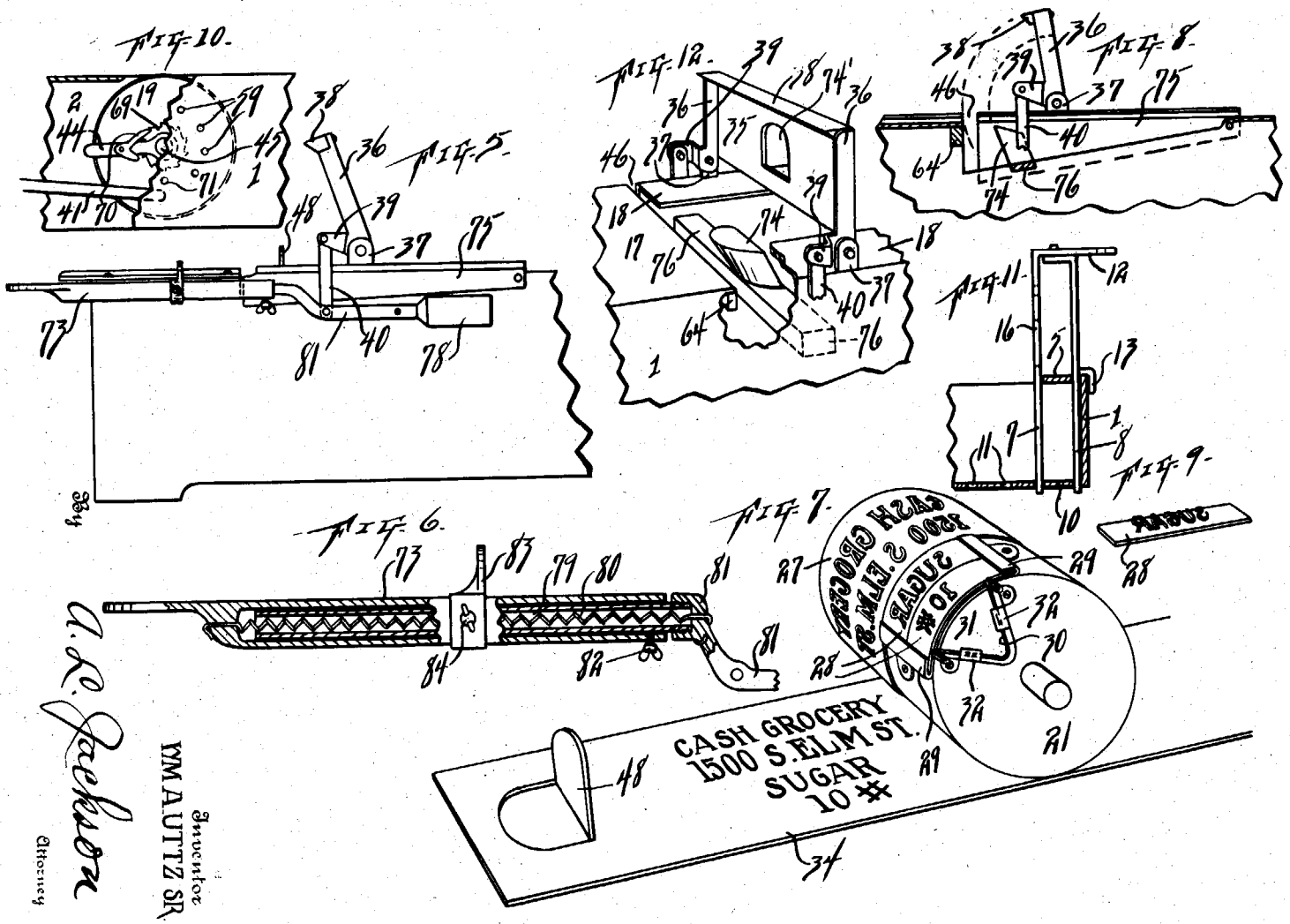
Inventor
WM A. UTTZ SR.
By A. L. Jackson
Attorney Reissued Oct. 18, 1927. Re. 16,774

UNITED STATES PATENT OFFICE.

WILLIAM A. UTTZ, SR., OF FORT WORTH, TEXAS, ASSIGNOR, BY MESNE ASSIGNMENTS, TO PERFECTION PACKAGE SEALER COMPANY, A CORPORATION OF TEXAS.

GUMMED-TAPE-SERVING MACHINE.

Original No. 1,592,431, dated July 13, 1926, Serial No. 77,934, filed December 28, 1925. Application for reissue filed May 10, 1927. Serial No. 190,348.

My invention relates to gum tape serving machines and more particularly to machines which not only prepare the tape for convenience in handling but also for advertising purposes; and the principal object of the invention is to provide a novel gummed tape serving machine wherein the tape will have a tab formed from the body of the tape at the end presented for grasping by the operator, the said tab being bent out of the plane of that end so that it may be grasped by the fingers of the operator without his bringing his fingers into contact with that portion of the tape destined to be moistened as it is drawn from the machine, a secondary object being the provision of a machine of this class arranged for automatically printing names and addresses or other advertising matter as the tape is reeled off for service. Other objects and advantages will be fully explained in the following description and the invention will be more particularly pointed out in the claims.

Reference is had to the accompanying drawings which form a part of this application.

Fig. 1 is a perspective view of the machine.

Fig. 2 is a broken vertical longitudinal section of the machine.

Fig. 3 is a longitudinal section of a tubing which carries a stop regulating pin which regulates the length of the tape to be cut off for service.

Fig. 4 is a vertical cross-section of the machine in front of one of the friction rollers.

Fig. 5 is a broken side elevation of a machine, showing a variation in the operating mechanism.

Fig. 6 is a longitudinal section of a manually operated lever.

Fig. 7 is a perspective view of one of the friction rollers, illustrating the means for printing words on the tape and showing the end of the tape.

Fig. 8 is a detail view of the perforator and tab forming device.

Fig. 9 is a perspective view of a detachable printing plate adapted to be used in connection with the other means for printing on the tape as it is dispensed.

Fig. 10 is a broken sectional view, illustrating a tripping mechanism for causing the cutting of the tape and for actuating the punching device for perforating the paper and forming a tab near the end of the paper for convenience in handling the strip.

Fig. 11 is a detail view of the adjustable roll supporting brackets.

Fig. 12 is a perspective view of a variation in the perforating mechanism.

Similar characters of reference are used to indicate the same parts throughout the several views.

The machine is provided with an upright casing or frame, having side members 1 and 2 and end members 3 and 4 and a top 5. The prepared tape comes in involute rolls and the drawings show a roll of tape 6 and means are shown for mounting the roll 6 so that it will be revolved as the tape is drawn off. A pair of adjustable brackets, each made in two parts 7 and 8, are provided and mounted on the casing. The outside member 8 is adjustable longitudinally and the casing is provided with slots 9 for the member 8 when set at different positions. This is necessary when larger or smaller rolls 6 are used. The member 7 is adjustable both longitudinally and laterally. These members 7 and 8 project through the bottom 10 and the bottom has a plurality of slots 11 so that the member 7 may be adjusted laterally. The member 7 has a lateral extension 12 to permit fastening to the member 8 at different adjustments. Pluralities of slots 11 are made laterally and longitudinally in the bottom 10 for the bracket members 7 and 8 and a plurality of slots 9 are made in the top member 5 for the adjustment of the bracket member 8. An ear 13 is struck from the member 8 and bent downwardly to rest on the top edge of the side member 1 to prevent the members 7 and 8 from going too low down. In adjusting the members 7 and 8 longitudinally, it will be necessary to remove the back end of the casing in case of larger rolls 6. It will be understood that similar bracket members 7 and 8 are provided on the opposite side of the machine. A shaft or spindle 14 is provided for the roll 6 and journaled in the bracket members 7 and 8 and pluralities of openings 15 are provided for vertical adjustment of the spindle 14. In order to prevent wabbling motion of the roll 6, flanges 16 are formed on the forward and back edges of the member 7 to rest against the side of the roll 6.

The tape is drawn off of the roll 6 manually and the tape actuates mechanism for cutting the tape in required lengths and also actuates mechanism for cutting and bending the tab intended to be grasped by the operator's fingers. The tape also actuates the printing mechanism and the moistening roller.

When the tape leaves the roll 6, it is fed onto a platform 17 which is longitudinally positioned and extends backwardly to a position in close proximity to the roll and this platform has guide strips 18 mounted on the lateral edges. The platform and the strips form a guide for the tape and the strips 18 are adjustable laterally for adapting the guide to tapes of different widths. The tape is directed into the guide manually. As the tape is pulled through the guide, it moves against a drum or roller 19 and passes on under a roller 20 which carries a blotter on the periphery thereof. A roller 21 is then let down on the tape. The rollers 19 and 21 are actuated by friction of the tape passing between the rollers. The roller 21 rests on the tape and presses the tape against the roller 19. The roller 21 is journaled in bearing members 23 which are attached to the top 5 of the machine. Means are provided for distributing ink on the roller 21. The rollers 22 are journaled in bearing members 26 which may be integral with the cross-member 24. The bearing members 26 have legs 24′ and loops 25 are formed on the bearing members 23 to receive and hold the legs 24′ of the bearing members 26. The journal bearings for the shafts of the rollers 22 are elongated vertically and the rollers 22 rest by gravity on the roller 21 and are yieldable vertically. An ink reservoir 27′ is mounted on the cross-member 24 for feeding ink to the rollers 22 and the rollers 22 feed ink to the roller 21. The roller 21 is provided with printing strips 27 and 28. The strip 27 may be permanently mounted on the periphery of the roller 21. The strip 27 bears type for printing the name and address of the dealer on the tape as the tape is drawn past the roller 21. Other advertising matter may be printed on the tape in the same manner. For printing the names of different articles of goods and the prices and quantities thereof, strips 28 are provided and rest on the periphery of the roller 21. The strips 28 are easily mounted and easily removed because they are for temporary use. The strips 28 are held in place by clips 29 and are held yieldingly against the strip 27 by a spring 30 which is held in place by a bracket 31 which has holes for attaching the bracket to the end of the roller 21 and has detents 32 struck therefrom for holding the wire 30 in place. As the strip or tape passes on from under the roller 21, it runs under the blotter roller 20 and the blotter thereon will absorb the surplus ink. The blotter roller 20 is yieldably mounted by arms 33 which are pivotally connected to the bearing members 26. The blotters may be removed as often as required.

Means are provided for cutting the tape 34 (from roll 6) in required lengths. A bracket 35 having lateral members 36 projecting forwardly and pivotally connected to lugs 37 carries a blade 38. The bracket members 36 have forwardly projecting arms or lugs 39. Link bars 40 are pivotally connected to the arms 39 and pivotally connected to levers 41 which are provided with fulcrums 42 which are rigid with the frame members 1 and 2. The levers 41 are provided with counter-balance weights 43. Arms 44 are rigid with the shaft 45 of roller 19. These arms 44 actuate the levers 41. The roller 19 is rigid with shaft 45. As the roller 19 is revolved by the passing tape 34, the arms 44 will engage the levers 41 and swing the blade 38 downwardly and cut the tape 34 at the required length, the blade passing slightly down in the slot 46 in the platform after it cuts the tape. The bracket 35 carries a cutter 47 which will cut a tab 48 from the tape remaining after the severing of a dispensed piece of tape at each stroke of the bracket 35, the cutting of the tape 34 and the tab 48 being accomplished at the same time. The object of the tab 48 is for convenience in drawing the tape through the rollers 19 and 21. The tape 34 actuates the rollers 19 and 21 by friction. After each stroke of the blade 38, the counter-weights 43 will restore the bracket 35 to normal position.

The shaft 45 is mounted in yielding bearings 49 by reason of springs 50. The roller 19 is provided with a barrel spring 51 which is attached to the shaft 45 and to a bracket 52 which is stationary with frame member 1. After each cutting operation, the roller 19 will be revolved by the spring 51 in the opposite direction. Provision is made to prevent the roller 19 from forcing the tape 34 backwardly. A lever 53, one on each side, is fulcrumed on the frame. This lever 53 performs two functions. It carries a detent 54 pivotally connected thereto and this detent carries a rubber grip 55. When the tape 34 is released after a cutting operation the roller 19 would tend to wind the tape backwardly. The grip 55 will stop the paper and the lever 53 will be elevated at that end and the other end of the lever 53 which is journaled on shaft 45 will force the roller 19 downwardly against the resistance of springs 50 so that the roller will be free from the tape during the time that the spring 51 is revolving said roller to its original position. On forward movement of the tape, the detent 54 being loosely mounted, will swing upwardly and not impede the passage of the tape.

There will be a slight amount of slack in the tape before the detent and grip 55 take effect on the tape. This slack may be taken up by a gravity idle roller 56, as shown in Fig. 1 or by springs 57 as shown in Fig. 2. Neither these springs 57 nor the roller 56 will interfere with the forward movement of the tape.

For regulating the length of the tape sections to be cut, levers 58 are rigid with the shaft 45. Sleeves 59 are mounted in the frame members 1 and 2 and made rigid therewith and the ends of the sleeves are flush with the outsides of the members 1 and 2. A pin or bolt 60 is provided to be inserted in any one of the sleeves 59. The pin 60 is to be inserted in the particular sleeve 59 which will determine the length of the tape sections to be cut. The object is to permit the roller 19 to turn just far enough to secure the length of the tape sections. In operation the roller 19 will turn until the levers 58 come against the pin or bolt 60. The pin or bolt 60 is provided with a lock 61. When the bolt is thrust through the sleeve 59, the lock 61 will swing down on the outside of the casing so that the pin or bolt 60 will not be accidentally withdrawn. The pin or bolt 60 may be provided with a cord 62 which is attached thereto and to the side of the casing so that the bolt will not be lost when not in use.

A shearing bar 64 is attached to the underside of the guide platform 17 to cooperate with the blade 38 in a cutting operation. The cutter 47 is provided with a lug or point 63 to raise the tab 48 when the cutter is withdrawn so that the tab can be grasped for drawing the tape forward for cutting off another section.

The means for moistening the tape for service include a water holding vessel 65. A roller 66 is provided with a shaft 67 and a box-like bearing device 68 is mounted in the container 65 and half circle cut-outs are made in the upper edges of the bearing member 68 for the shaft 67. The roller 66 is an idler and is moved by the tape as the tape is drawn from the machine. With such arrangement there can be no leaking of the moistening liquid through the bearings.

The variation, shown in Fig. 10, the roller 19 does not turn backward. This roller, in this case, is revolubly mounted on the shaft. A ratchet wheel 69, one on each side of machine, is rigid with the roller 19 and the lever or arm 44 is fixedly mounted on the shaft 45. The arm 44 is locked rigid with the shaft 45 by means of the dog 70 and ratchet 69. The roller 19 will revolve until the dog 70 strikes a stop pin 71 and the dog will be tripped. The arm 44 will be revolved back to the starting point by a barrel spring 51 which is attached to the bracket 52 and to the arm 44. The movement of the arm 44 is limited by the engagement of the arm 58 with the pin 60. The location of the pin 60 will determine the length of the tape sections to be cut.

In the variation shown in Figs. 5 and 8, the machine is manually operated. A lever 73 is fulcrumed on the outside of the casing and is used to actuate the blade 38. The only difference in the operation is that the cutter 74 is located below instead of above for perforating the tape and cutting the tab 48. A section of the top members 17 and 18 is cut from these members and the section 75 is hingedly connected to the sides 1 and 2. A bar 76 is horizontally disposed in the casing below the top and attached to the sides 1 and 2 and a cutter 74 is mounted on the bar 76 at the central part of the machine and the bracket 35 is attached to the section 75 and provided with an opening 74′ for the cutter 74. The bracket 35 is swung downwardly below the top of the machine towards the front and an opening is made in the bracket and this opening passes down over the cutter 74 for cutting the tab 48. The bracket 35 is operated by the hand lever 73 which is provided with a counterweight 78.

The handle or lever 73 is made telescopic for the purpose of cutting tapes at different lengths. The main portion of the lever 73 is made hollow and a tube 79 is inclosed therein. A spiral spring 80 is inclosed in the tube 79 and attached at one end to the lever 73 and at the other end attached to the severed portion 81 of the lever 73. The parts 73 and 79 are fixedly held together by a screw 82 to cut any required length.

The screw 82 may be loosened and the tube 79 drawn out as far as may be required and then tightened by the screw 82. The further the tube 79 is drawn out, the longer the sections of tape may be cut. A gauge 83 is provided for determining how long to cut the tape. The tape will be drawn forward until the hand strikes the gauge 83. The handle may be used without the set screws and the sections of tape may be cut as long as a person would want simply by pulling the gauge 83 along on the handle. When the handle is released, the spring will draw the parts back as shown in Fig. 6. The gauge 83 may be set at any position by screw 84 which bears against the member 73 and in drawing the tape forward, the fingers will come against the gauge and the gauge could be moved along with the member 73 if the screw 82 is loosened.

The tabs 48 on the strips of tape make the strips of tape more easily handled and make the handling more sanitary or cleanly due to the fact that tabs do not become moist in passing over the moistener roller.

What I claim is,—

1. In a machine for dispensing gummed tape, a holder for a roll of said tape, means for guiding the tape along a predetermined path with its gummed side down, a moistening device below said tape, a tab forming and bending device adjacent a point in said path between the roll and moistening device and arranged to partially sever a portion of the tape to form a tab and to force the partially severed portion upwardly out of the plane of the tape at said point in position to be gripped by the fingers of the user from above the tape and away from the moistening device, a cutter to sever a portion of said tape, and means to actuate the said tab forming device and cutter in unison.

2. In a machine for dispensing gummed tape, a holder for a roll of said tape, means for guiding the tape along a predetermined path with its gummed side down, a tab forming and bending device adjacent a point in said path between the roll and moistening device and arranged to partially sever a portion of the tape to form a tab and to force the partially severed portion upwardly out of the plane of the tape at said point in position to be gripped by the fingers of the user from above the tape and away from the moistening device, a cutter to sever a portion of said tape, and friction means to actuate the said tab forming device and cutter in unison.

3. In a device of the kind described, a base, a web severing and tab cutting device carried by the base, and means spaced from the severing device to grip and hold the portion of the web to be severed during the severing and tab forming operation.

4. In a machine for dispensing tape like material, a base, a cutter frame swingingly mounted on said base, a severing knife carried by the cutter frame, a tab cutting mechanism operably associated with the cutter frame, and means actuated by the movement of the cutter frame and arranged to bend the cut tab out of the plane of the material.

5. In a machine for dispensing tape like material, a base over which the material passes, a cutter frame carrying a tape severing knife and mounted on the base to move the knife across the path of the tape, a tab cutter operatively associated with the cutter frame and arranged to partially sever a portion of the tape from the remainder to form a tab, and means operated by the movement of the cutter frame and arranged to force the partially severed tab portion of the tape upwardly out of the plane of the remainder of the tape and into position to be grasped by the fingers of the operator.

6. In a machine for dispensing lengths of tape, means for cutting off a length of tape, and other means operably associated therewith for forming a finger grip tab on the remainder of the tape in spaced relation to the end from which the length is cut off.

7. In a machine for dispensing lengths of tape, means for cutting off a length of tape, and other means operably associated therewith for forming a finger grip tab on the remainder of the tape at the end from which the length is cut off, said last means including a cutter for partially severing the tab and a bending device for bending the tab portion out of the plane of the remainder of the tape.

8. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, and a tab bending device operable by the movement of the cutter frame and arranged to force the cut tab from the base.

9. In a tape dispensing machine, means for guiding a tape along a predetermined path, a tab forming and bending device adjacent a point in said path and arranged to partially sever a portion of the tape to form a tab and to force the partially severed portion out of the plane of the tape at that point, and means to actuate said device.

10. In a tape dispensing machine, means for guiding a tape along a predetermined path, a tab forming and bending device adjacent a point in said path and arranged to partially sever a portion of the tape to form a tab and to force the partially severed portion out of the plane of the tape at that point, a tape severing device adjacent the tab forming device, and means to actuate said devices in unison.

11. In a machine for dispensing lengths of tape, means for cutting off a length of tape and for forming a finger grip tab on the remainder of the tape at the end from which the length is cut off, means for bending the tab portion out of the plane of the remainder of the tape and an operative connection between said means.

12. In a tape dispensing machine, means for guiding a tape along a predetermined path, a tab forming and bending device adjacent a point in said path and arranged to partially sever a portion of the tape to form a tab and to force the partially severed portion out of the plane of the tape at said point, and means actuated by friction against the tape for operating the tab forming and bending device.

13. In a tape dispensing machine, means for guiding a tape along a predetermined path, a tab forming and bending device adjacent a point in said path and arranged to partially sever a portion of the tape to form a tab and to force the partially severed portion out of the plane of the tape at said point, a tape severing device adjacent the tab forming device, and means actuated by friction against the tape for operating the tab forming and bending device and the severing device in unison.

14. In a tape dispensing machine, means for guiding the strip of tape as it is manually drawn from the machine, means actuated by friction against the passing tape for severing the tape in required lengths, and means actuated by and simultaneously with the severing means for cutting tabs near the ends of the severed sections and bending them out of the plane of the tape.

15. In a tape dispensing machine, means for guiding the strip of tape as it is manually drawn from the machine, a blade for severing sections from the tape in required lengths, a bracket carrying said blade and pivoted to swing said blade across the path of the passing tape, a stationary blade close under the passing strip for cooperating with said swinging blade, a roller actuated by friction against the passing tape and provided with an actuating arm, a lever operatively connected with said bracket and normally standing in the path of said arm and adapted for actuation by said arm when said roller is revolved, a tab cutting device carried by said bracket, and means to bend the cut tab out of the plane of the tape.

16. In a machine for dispensing lengths of tape, a base over which the tape is moved, a cutter frame swingingly mounted on the base, a severing blade carried by the cutter frame, a tab cutter carried by the cutter frame, and arranged to cut a tab in the unsevered portion of the tape simultaneously with the severing of a portion of said tape, a tab bending device operable by the movement of the cutter frame and arranged to force the cut tab upwardly from the base, and means to support the tab against downward movement during the cutting operation.

WILLIAM A. UTTZ, Sr.